UNITED STATES PATENT OFFICE.

HARRY PERCIVAL SLATER, OF CEDAR RAPIDS, IOWA.

IODIN COMPOUND AND METHOD OF PREPARING SAME.

1,226,394. Specification of Letters Patent. Patented May 15, 1917.

No Drawing. Application filed November 15, 1915. Serial No. 61,689.

*To all whom it may concern:*

Be it known that I, HARRY P. SLATER, a citizen of the United States, residing at Cedar Rapids, in the county of Linn and State of Iowa, have invented certain new and useful Improvements in Iodin Compounds and Methods of Preparing Same, of which the following is a specification.

My invention relates to therapeutic compounds of hexa-methylene-tetra-amin and iodin and methods for preparing the same. It has long been known that addition products of hexa-methylene-tetra-amin and iodin may be prepared by treating aqueous solutions of hexa-methylene-tetra-amin with an aqueous solution of iodin formed, for example, by dissolving iodin in an aqueous solution of potassium iodid, or by treating an alcoholic solution of iodin with an aqueous solution of hexa-methylene-tetra-amin, or by treating an alcoholic solution of hexa-methylene-tetra-amin with an alcoholic solution of iodin. The foregoing methods have proved to be unsatisfactory for the commercial production of stable and valuable therapeutic compounds, because of factors, which have made it difficult to produce stable and uniform compounds free from undesirable impurities. Thus if water and an aqueous solution of potassium iodid are used as the solvents, free iodin is quite likely to be precipitated, together with one or more addition products of hexa-methylene-tetra-amin. The product formed in this case is less stable and more irritating in character because of the presence of the free iodin. The results from the other methods referred to, wherein alcohol is used as the solvent for one or both substances, are of perhaps even less value than that obtained from the method first mentioned, as other and undesirable co-reactions occur. Thus a considerable amount of ethyl iodid is formed. This substance is quite difficult to separate from the alcohol. Such by-products accumulate in the alcohol when the latter is recovered and repeatedly used as a solvent and interfere with the purity of the product as well as reducing the solvent capacity of the alcohol. Also, this method is rendered unduly expensive because of the high cost of alcohol and the comparatively low solubility of hexa-methylene-tetra-amin in the same, and the fact that also there is a considerable loss of alcohol by evaporation. My invention produces a novel compound in which the difficulties above referred to are obviated and which I have found to be of great value in medicine, for example, for antiseptic external usage and for alterative and antiseptic internal usage. The product may be used, as stated, in internal medicine with beneficial results because of the elimination, to a sufficient degree, of the impurities which have previously rendered such usage of little value.

My invention is based upon the discovery that the orange-yellow precipitate, formed by the reaction of hexa-methylene-tetra-amin upon iodin, may be beneficially transformed by treating the same with ammonia, which results in the formation of a precipitate which is of a rich red color and is less flocculent and more finely divided than was the yellow precipitate. The addition product first formed is preferably made by the action of an aqueous solution of hexa-methylene-tetra-amin upon iodin previously dissolved in distilled water by the aid of potassium iodid, the orange-yellow precipitate formed being washed with distilled water and then mixed with ammonia water to which is added a considerable quantity of distilled water. The red precipitate formed is recovered on a filter, washed with distilled water and allowed to dry spontaneously. The filtrate or liquid from which the first addition product was separated may also be treated with ammonia, either separately or together with the precipitate referred to, and an additional amount of the red precipitate recovered therefrom. By this method, the undesirable by-products of the process involving alcohol as a solvent are obviated, and the treatment with ammonia prevents the presence of the undesirable free iodin in the final compound. The ammonia used may be in gaseous form, but is preferably in aqueous solution as stated. Addition compounds of various iodin contents may be prepared by the process described; my particular aim, however, is to produce hexa-methylene-tetra-amin periodid which may easily be produced to have almost the theoretical composition of tetraiodid.

As an example of a specific manner in which my improved process may be carried out and my improved product thereby formed, the following may be given. A solution of 63.5 grams of potassium iodid and 50.8 grams of iodin in 750 cc. of distilled water is prepared at normal or room temperature, and a solution of 14 grams of hexa-methylene-tetra-amin in 100 cc. of distilled water added while stirring, and stirring continued for one-half hour. The precipitated addition product is then separated from the liquid by filtration, centrifugalization or other convenient means. The precipitate, after washing with 1,000 cc. of water, is added to a mixture of 25 cc. strong ammonia water and 975 cc. water and stirred for one hour. Meanwhile 12 cc. strong ammonia water previously diluted with 100 cc. water is added to the filtrate, or liquid, remaining after the separation of the precipitate formed by the first reaction. This liquid is stirred a few minutes, or until a red colored precipitate is formed, and then allowed to stand one hour. This precipitate is then collected on a filter and afterward the precipitate from the first reaction, which has been treated with ammonia as described, is collected on the same filter. The product is washed with 1,000 cc. distilled water and dried quickly without the application of heat in a vacuum drier, or by other convenient means. All of the liquids and washings should be saved and the iodin content recovered as potassium iodid which may be almost completely effected by simple and accepted manipulations.

The product as thus formed is uniform in character and sufficiently stable to be kept for considerable periods without deterioration. It is sufficiently free from undesirable impurities. such as uncombined iodin and ethyl iodid, to permit its satisfactory uses in internal medicine as stated. While minute proportions of such impurities may remain in the product, the amount of the same is insufficient to produce a deleterious effect when the compound is used internally. I therefore refer to this product as being practically free from impurities such as those mentioned.

The product described herein is a rich red finely divided product, apparently amorphous since no crystal formation is apparent. It is more slowly soluble in alcohol, ether, acetone, and chloroform than is hexa-methylene-tetra-amin-tetraiodid, which has not been treated with ammonia as described herein. In the preferred product it is thought desirable that the iodin content should be practically equal to that in the theoretical formula for hexa-methylene-tetra-amin-tetraiodid; while the quantitative formula for the red powder is in this case the same as that of the tetraiodid, it has apparently a chemical identity of its own, and may be an isomeric form of the tetraiodid. An additional indication that the new product is different from the known tetraiodid is found in the fact that while the known product is not affected by the friction of trituration in a mortar, the new red powder explodes very quickly when rubbed.

The exact effect of the ammonia treatment of the product, described above, is difficult of determination. It would seem that it produces a re-arrangement of the atoms within a molecule of the tetraiodid. Apparently the ammonia does not combine with the retained product, but it does combine with any free iodin that may exist in the treated compound, producing various soluble compounds of ammonia and iodin, and possibly some of the so-called nitrogen-iodid. All of these products go into solution in the diluted ammonia and are removed by the washing, thus leaving the precipitated product in a much purer condition.

Gauze may be impregnated with my new material, for antiseptic use, etc. very easily, by putting the gauze in the iodin solution, then adding the hexa-methylene-tetra-amin solution, and allowing the resultant compound to be formed within the texture of the gauze. This is followed by the ammonia treatment, the same as has been already described, which changes the chemical in the gauze in the manner already described. The gauze is then removed and quickly dried.

Certain important characteristics of the improved product, or red powder, are the following:—It has, as stated, a rich red color, whereas the previously known periodid, which has not been treated with ammonia, is yellow. The percentage content of iodin does not vary with age, in the red powder, within limits allowable in quantitative analysis, through a long period of time, when exposed to room conditions. For example, one sample of red powder, hexamethyleneamin tetraiodid, has remained constant in its percentage of contained iodin for over eight months. On the other hand the previously known tetraiodid, yellow powder, degenerates very appreciably in three days, under similar conditions, changing in appearance, darkening in color, and subliming iodin on the surface of the container above the powder. An analysis of the yellow powder tetraiodid after exposure to room conditions for one month shows a decided depreciation in the iodin content, the sample at that time apparently being a mixture of the diiodid and tetraiodid.

Also the red powder tetraiodid has a flash point of 138° C., at which temperature it decomposes by explosion. The known tetraiodid, yellow powder, appears to have no definite flash point, and no explosion accompanies its decomposition when heated, but it undergoes constant decomposition under normal room temperature and pressure, and evolves the major part of its iodin content by the time it has been heated to 150° C.

It is believed, as stated, that a rearrangement within the molecule is effected when the yellow powder tetraiodid is treated with ammonia as described. I assume that the yellow powder tetraiodid may be represented by the following graphic formula.

*Known hexamethyleneamin tetraiodid.*

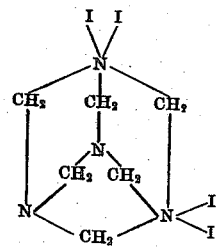

In this diagram two nitrogens function as pentavalent elements and saturate themselves with iodin, the other two functioning as trivalent elements, as in hexamethyleneamin. When, however, this compound is treated with ammonia, as stated, it would seem that each nitrogen then claims one atom of iodin, and that the four unsaturated nitrogen valencies claim each other as affinities, two by two, as represented by the following diagram.

*New hexamethyleneamin periodid.*

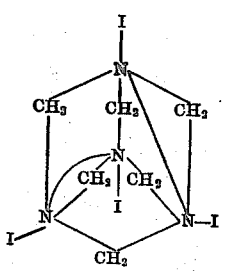

In this latter compound all four nitrogens function in exactly the same way toward the balance of the molecule, which seems to account for its greater stability. As stated, the red powder when heated gives off its iodin content practically as a unit; this is explained by the last diagram, in which no nitrogen can release its iodin without apparently destroying the entire molecule. This is seen inasmuch as nitrogen may exercise a valency of three or five, but not a valency of four. On the other hand, the diagram of the yellow powder shows how practically any part, or the whole, of the iodin content, may be evolved without destroying the molecule.

The described red powder is a considerable improvement as a therapeutic agent, because of its stability, and because it is less irritating when taken internally, than the previously known yellow powder.

Having now described my invention, what I claim as new therein and desire to secure by Letters Patent is as follows:—

1. The process of producing addition products of hexa-methylene-tetra-amin and iodin, comprising effecting a reaction between hexa-methylene-tetra-amin and iodin thereby forming an addition product, and treating the same with ammonia, substantially as set forth.

2. The process of producing addition products of hexa-methylene-tetra-amin and iodin, comprising effecting a reaction between an aqueous solution of hexa-methylene-tetra-amin and a solution of iodin in a suitable solvent, thereby forming and precipitating an addition product, separating the same from the liquid, and treating the same with ammonia, substantially as set forth.

3. The process of producing a compound of hexa-methylene-tetra-amin and iodin, consisting in stirring together an aqueous solution of hexa-methylene-tetra-amin, potassium iodid and iodin, until precipitation of hexa-methylene-tetra-amin-periodid, washing the precipitate with water, and mixing the same with an aqueous solution of ammonia, washing the precipitate formed with water, and drying the same without addition of heat, substantially as set forth.

4. The process of producing a compound of hexa-methylene-tetra-amin and iodin, consisting in stirring together aqueous solutions of hexa-methylene-tetra-amin and iodin, at room temperature, to form an orange-yellow precipitate, washing the same with distilled water, and treating the same with ammonia, to form a finely-divided, red powder, substantially as set forth.

5. The process of producing a compound of hexa-methylene-tetra-amin and iodin, consisting in stirring together aqueous solutions of hexa-methylene-tetra-amin with iodin, at room temperature, to form an orange-yellow precipitate, and treating both the precipitate and the liquid in which the precipitate forms with ammonia, to form a finely-divided red powder, substantially as set forth.

6. The process of producing a compound of hexa-methylene-tetra-amin and iodin, consisting in stirring together aqueous solutions of hexa-methylene-tetra-amin and iodin, at room temperature, to form an orange-yellow precipitate, separating the same from the liquid, mixing the same with aqueous ammonia, and forming a precipitate mixing aqueous ammonia with the liquid from which the precipitate was formed, collecting a precipitate therefrom, and mixing together, washing and drying the precipitate, substantially as set forth.

7. A new composition of matter, having the quantitative formula of hexa-methylenetetra-amin-periodid; having a rich red color, and characterized by the fact that its percentage content of iodin does not appreciably depreciate or vary when the compound is exposed to normal room conditions for a period of one month, substantially as set forth.

8. A new composition of matter, having the quantitative formula of hexa-methylene-tetra-amin periodid; having a rich red color and a flash point of approximately 138° C., substantially as set forth.

This specification signed and witnessed this 9th day of Nov., 1915.

HARRY PERCIVAL SLATER.

Witnesses:
HARRY L. MARSHALL,
JOHN L. MILLER.